(12) United States Patent
Jang

(10) Patent No.: US 9,850,800 B2
(45) Date of Patent: Dec. 26, 2017

(54) EXHAUST SYSTEM HAVING GASKET

(71) Applicant: HYUNDAI MOTOR COMPANY, Seoul (KR)

(72) Inventor: ChunSoon Jang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 62 days.

(21) Appl. No.: 14/958,736

(22) Filed: Dec. 3, 2015

(65) Prior Publication Data
US 2017/0022875 A1   Jan. 26, 2017

(30) Foreign Application Priority Data
Jul. 20, 2015   (KR) .................. 10-2015-0102671

(51) Int. Cl.
| | | |
|---|---|---|
| *F01N 13/08* | (2010.01) | |
| *F01N 13/18* | (2010.01) | |
| *F01N 3/20* | (2006.01) | |
| *F01N 3/10* | (2006.01) | |

(52) U.S. Cl.
CPC ....... *F01N 13/1822* (2013.01); *F01N 3/2066* (2013.01); *F01N 13/1827* (2013.01); *F01N 3/101* (2013.01); *F01N 3/103* (2013.01); *F01N 13/1855* (2013.01); *F01N 13/1872* (2013.01); *F01N 2340/06* (2013.01)

(58) Field of Classification Search
CPC ...... F01N 3/101; F01N 3/103; F01N 13/1805; F01N 13/1822; F01N 13/1827; F01N 13/1855; F01N 13/1872; F01N 2340/06

USPC ........................................ 60/280, 299, 324
See application file for complete search history.

(56) References Cited

U.S. PATENT DOCUMENTS

| | | | | |
|---|---|---|---|---|
| 4,494,722 A | * | 1/1985 | Kanai | B60K 13/04 248/566 |
| 4,559,776 A | * | 12/1985 | Arai | F01N 3/28 60/280 |
| 2001/0047897 A1 | * | 12/2001 | Steenackers | B60K 13/04 180/89.2 |
| 2009/0072495 A1 | * | 3/2009 | Kullen | F16J 15/0887 277/630 |
| 2012/0038152 A1 | * | 2/2012 | Loebig | F01D 25/28 285/411 |

(Continued)

FOREIGN PATENT DOCUMENTS

| | | |
|---|---|---|
| JP | 2004-150292 A | 5/2004 |
| KR | 10-0916402 B1 | 9/2009 |

(Continued)

*Primary Examiner* — Jorge Leon, Jr.
(74) *Attorney, Agent, or Firm* — McDermott Will & Emery LLP

(57) ABSTRACT

An exhaust system having a gasket includes a turbocharger disposed to be rotated by exhaust gas, a warming up catalytic converter through which exhaust gas discharged from the turbocharger passes and which purifies the exhaust gas, a connecting pipe disposed between the turbocharger and the warming up catalytic converter and which delivers the exhaust gas, a gasket interposed between an inlet side flange of the connecting pipe and an outlet side flange of the turbocharger, and which seals the exhaust gas, and a stay which connects the warming up catalytic converter to a vehicle body, and includes an elastically flexible curved line portion formed at one side of the stay.

13 Claims, 5 Drawing Sheets

(56) References Cited

U.S. PATENT DOCUMENTS

| | | | |
|---|---|---|---|
| 2014/0060690 A1* | 3/2014 | Jang | F01N 13/008 138/155 |
| 2014/0217679 A1* | 8/2014 | Barrall | C23C 24/082 277/592 |
| 2014/0373821 A1* | 12/2014 | Kitagawa | F01M 11/08 123/572 |
| 2015/0089932 A1* | 4/2015 | Takatsu | F01N 13/08 60/299 |

FOREIGN PATENT DOCUMENTS

| | | |
|---|---|---|
| KR | 10-2009-0120848 A | 11/2009 |
| KR | 10-2010-0029900 A | 3/2010 |
| KR | 10-1028270 B1 | 4/2011 |
| KR | 10-1371462 B1 | 3/2014 |

* cited by examiner

Section A - A

Section B - B

EXHAUST SYSTEM HAVING GASKET

CROSS-REFERENCE TO RELATED APPLICATION

This application claims the benefit of priority to Korean Patent Application No. 10-2015-0102671, filed with the Korean Intellectual Property Office on Jul. 20, 2015, the entire contents of which are incorporated herein by reference.

TECHNICAL FIELD

The present disclosure relates to an exhaust system for a turbocharged vehicle, and more particularly, to an exhaust system having a gasket that seals between a flange of a connecting pipe of a warming up catalytic converter and an outlet side flange of a turbocharger in a turbocharged engine.

BACKGROUND

In general, exhaust gas discharged from an engine of a vehicle includes CO, HC, NOx, and the like, which are harmful to humans. As a post-processing device that oxidizes or reduces the harmful exhaust gas to convert the harmful exhaust gas into $CO_2$, $H_2O$, $N_2$, and the like, which are harmless to humans, a catalytic converter is provided in an exhaust system in the vehicle.

Recently, in order to meet exhaust gas regulations that have gradually become stricter, a warm up catalytic converter (WCC) post-processing device is applied which is a catalytic device with high purification efficiency that may effectively oxidize SOF components as well as CO components and HC components that are included in the exhaust gas.

Here, the WCC post-processing device is constructed such that an inlet and an outlet are opposite to each other at both sides of a case having a cylindrical shape. A carrier, which oxidizes various harmful components included in the exhaust gas, is mounted in the case, and a mat is interposed between the carrier and the case.

For example, the WCC post-processing device is configured in an exhaust system of a turbocharged engine, and the WCC post-processing device of the exhaust system of the turbo engine is provided with a gasket that fastens an exhaust flange and a turbo flange by means of studs when the gasket is interposed between the exhaust flange and the turbo flange, thereby sealing the exhaust gas leaking between the exhaust flange and the turbo flange.

As one example of the gasket in the related art, the gasket has a sealing structure in which metal plates are disposed to face each other at an interval, a plurality of stud holes, which the studs penetrate, is provided in the metal plates, and mica, which is a non-metallic material, is interposed between the metal plates.

Here, in the gasket, a portion around the stud holes to which the studs are fastened may be defined as a fastening portion, and a central portion around an exhaust gas passage through which the exhaust gas passes may be defined as a sealing portion.

However, the gasket in the related art has a problem in that the exhaust gas frequently leaks because of a collapse of the mica material at the sealing portion between the metal plates, a decrease in surface pressure at the fastening portion, and the occurrence of cracks in the fastening portion. In particular, because a stay, which fixes the warming up catalytic converter to a vehicle body, is formed to have a hard structure, bolts are loosened or the sealing portion of the gasket is deformed, which may cause a leak of the exhaust gas.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide an exhaust system having a gasket which improves both sealing performance and durability between a turbocharger and a warming up catalytic converter by enhancing a stay that supports the warming up catalytic converter.

An exemplary embodiment of the present disclosure provides an exhaust system having a gasket, the exhaust system including: a turbocharger which is disposed to be rotated by exhaust gas; a warming up catalytic converter through which exhaust gas discharged from the turbocharger passes and which purifies the exhaust gas; a connecting pipe which is disposed between the turbocharger and the warming up catalytic converter and delivers the exhaust gas; a gasket which is interposed between an inlet side flange of the connecting pipe and an outlet side flange of the turbocharger, and seals the exhaust gas; and a stay which connects the warming up catalytic converter to a vehicle body, and has an elastically flexible curved line portion formed at one side of the stay.

The exhaust system may further include a housing arm which protrudes from one side of an outer cover housing of the warming up catalytic converter, in which one end of the stay is fixed to the vehicle body, and the other end of the stay is connected to the housing arm.

The stay may include: a vehicle body fixing plate which is fixed to the vehicle body; a housing fixing plate which is fixed to the housing arm; and a flexible curved line portion which is disposed between the vehicle body fixing plate and the housing fixing plate and has a predetermined curved line shape.

The vehicle body fixing plate, the housing fixing plate, and the flexible curved line portion may be integrally formed by bending a single plate.

One surface of the flexible curved line portion may be convex, and the other surface thereof may be concave.

A stepped protrusion, which protrudes toward the outlet side flange of the turbocharger, may be formed at a central portion of the inlet side flange of the connecting pipe through which the exhaust gas flows, and a stepped groove, which corresponds to the stepped protrusion, may be formed in the outlet side flange of the turbocharger.

A stepped protrusion, which protrudes toward the outlet side flange of the turbocharger, may be formed at a central portion of the inlet side flange of the connecting pipe through which the exhaust gas flows, a stepped groove, which corresponds to the stepped protrusion, may be formed in the outlet side flange of the turbocharger, and the gasket may be interposed at a portion except for the stepped protrusion and the stepped groove.

A stepped protrusion, which protrudes toward the inlet side flange of the connecting pipe, may be formed at a central portion of the outlet side flange of the turbocharger through which the exhaust gas flows, a stepped groove, which corresponds to the stepped protrusion, may be formed in the inlet side flange of the connecting pipe, and the gasket may be interposed at a portion except for the stepped protrusion and the stepped groove.

A bolt hole to which a bolt is fastened may be formed in the gasket, the gasket may have a first thickness that corresponds to the bolt hole, the gasket may have a second thickness that corresponds to a portion where no bolt hole is formed, and the second thickness may be greater than the first thickness by a predetermined length.

The housing arm may be fixed to the outer cover housing adjacent to an outlet side flange of the warming up catalytic converter.

Another exemplary embodiment of the present disclosure provides a vehicle having an exhaust system including: an engine which is disposed on a vehicle body to generate torque by combusting fuel; a turbocharger which is disposed to be rotated by exhaust gas discharged from the engine; a warming up catalytic converter through which exhaust gas discharged from the turbocharger passes and which purifies the exhaust gas; and a stay which connects the warming up catalytic converter to the vehicle body, and has an elastically flexible curved line portion formed at one side of the stay.

The vehicle may further include a housing arm which protrudes from one side of an outer cover housing of the warming up catalytic converter, in which one end of the stay is fixed to the vehicle body, and the other end of the stay is connected to the housing arm.

The stay may include: a vehicle body fixing plate which is fixed to the vehicle body; a housing fixing plate which is fixed to the housing arm; and a flexible curved line portion which is disposed between the vehicle body fixing plate and the housing fixing plate and has a predetermined curved line shape.

The vehicle body fixing plate, the housing fixing plate, and the flexible curved line portion may be integrally formed by bending a single plate.

One surface of the flexible curved line portion may be convex, and the other surface thereof may be concave.

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Figure 1:
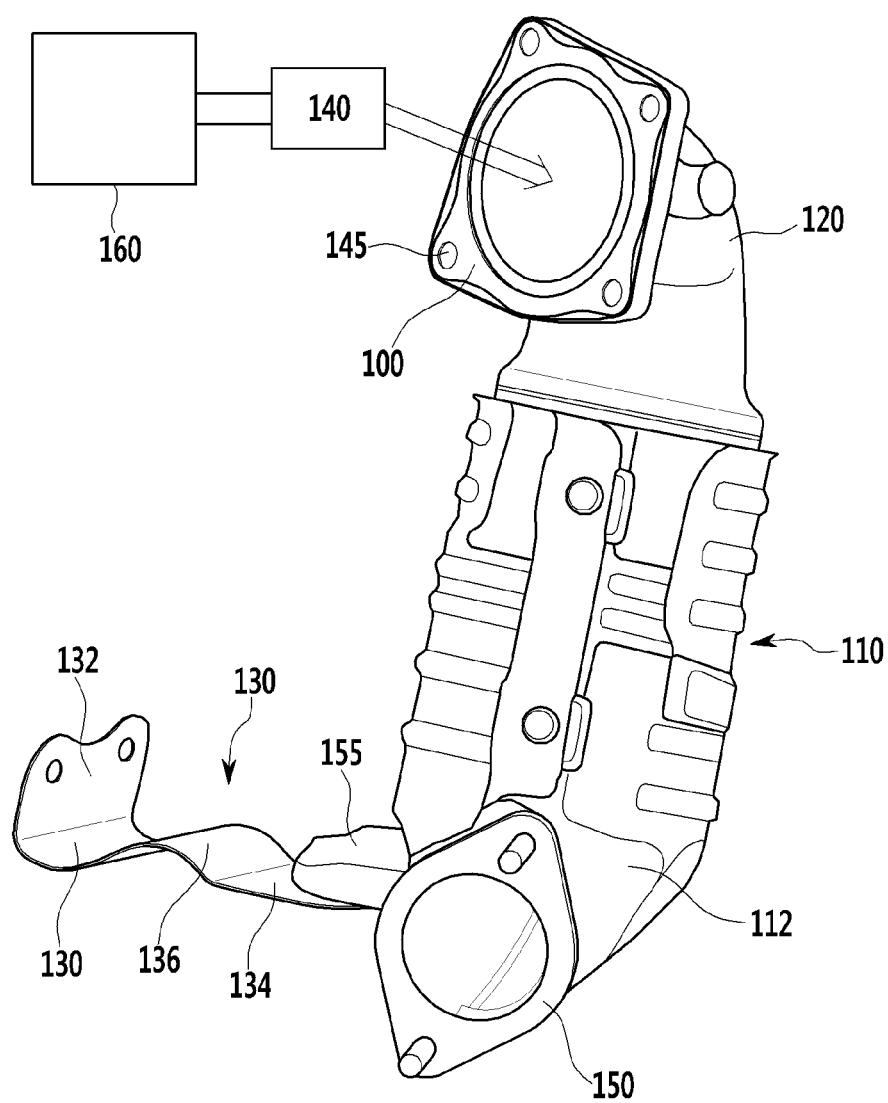
FIG. 1 is a partial perspective view of an engine system having an exhaust system according to an exemplary embodiment of the present disclosure.

FIG. 1 is a partial perspective view of an engine system having an exhaust system according to an exemplary embodiment of the present disclosure.

Referring to FIG. 1, an engine system may include an engine 160, a turbocharger 140, bolt holes 145, a gasket 100, a connecting pipe 120, a warming up catalytic converter 110, a housing 112, a catalyst outlet flange 150, a housing arm 155, and a stay 130, and the stay 130 includes a vehicle body fixing plate 132, a flexible curved line portion 136, and an arm fixing plate 134.

The engine 160 generates torque through a combustion process, and combusted exhaust gas is discharged to the outside through the turbocharger 140, the connecting pipe 120, and the warming up catalytic converter 110.

The connecting pipe 120 is disposed at an inlet side at an upper side of the warming up catalytic converter 110, the gasket 100 is disposed on a connecting pipe inlet flange 210, and bolt holes 145 into which bolts are inserted are formed in the gasket 100 and the connecting pipe inlet flange 210.

The catalyst outlet flange 150 is formed at a lower side of the warming up catalytic converter 110, the housing 112 is disposed at an outer side of the warming up catalytic converter 110, and the housing arm 155 protrudes from the housing 112 adjacent to the catalyst outlet flange 150.

The vehicle body fixing plate 132, which is fixed to the vehicle body, is formed at one end of the stay 130, the arm fixing plate 134, which is fixed to the housing arm 155, is formed at the other end of the stay 130, and the flexible curved line portion 136 is formed between the vehicle body fixing plate 132 and the arm fixing plate 134.

In the exemplary embodiment of the present disclosure, the flexible curved line portion 136, the vehicle body fixing plate 132, and the arm fixing plate 134 are integrally formed by bending a single plate, and one surface of the flexible curved line portion 136 is formed as a convex surface, and the other surface thereof is formed as a concave surface that corresponds to the convex surface.

Figure 2:
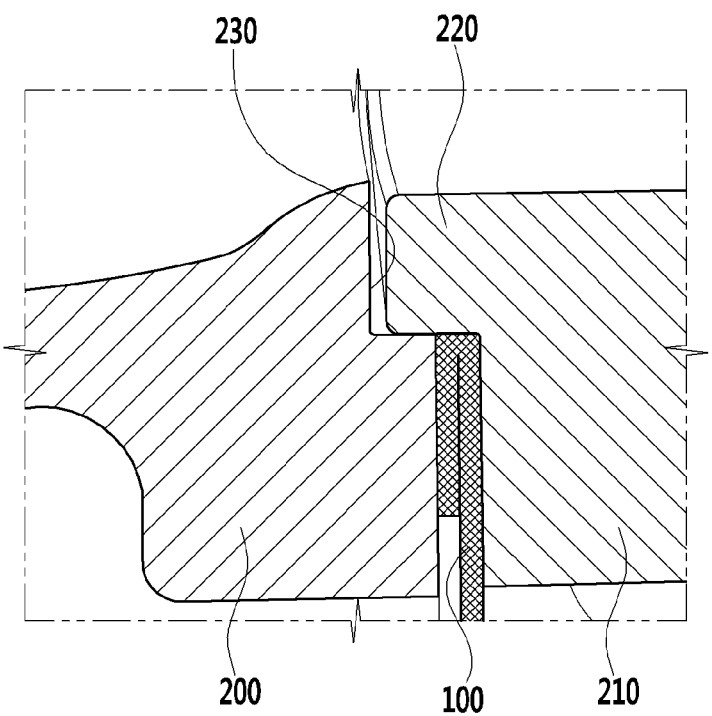
FIG. 2 is a partial cross-sectional view of the exhaust system having a gasket according to the exemplary embodiment of the present disclosure.

FIG. 2 is a partial cross-sectional view of the exhaust system having a gasket according to the exemplary embodiment of the present disclosure.

Referring to FIG. 2, a turbocharger outlet flange 200 is formed at an outlet side of the turbocharger 140, a connecting pipe inlet flange 210 is formed at an inlet side of the connecting pipe 120, and the turbocharger outlet flange 200 and the connecting pipe inlet flange 210 are disposed to face each other with the gasket 100 interposed therebetween.

Furthermore, the gasket 100 is interposed between the turbocharger outlet flange 200 and the connecting pipe inlet flange 210.

A stepped protrusion 220 protrudes from an inner circumferential surface of the connecting pipe inlet flange 210 through which the exhaust gas flows, a stepped groove 230, which corresponds to the stepped protrusion 220, is formed in the turbocharger outlet flange 200, and the gasket 100 is disposed at a portion, except for the stepped protrusion 220 and the stepped groove 230, so as to prevent the exhaust gas from leaking to the outside.

Figure 3:
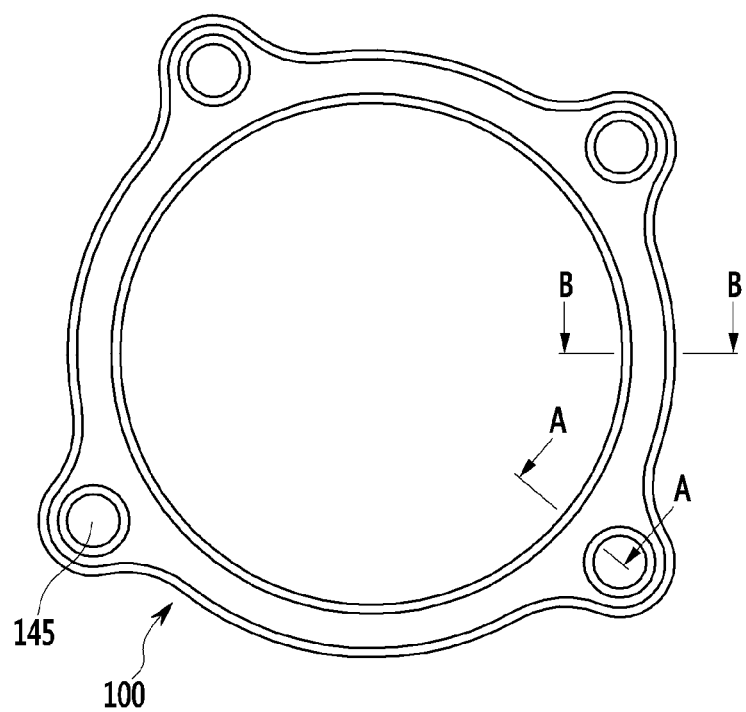
FIG. 3 is a top plan view of the gasket according to the exemplary embodiment of the present disclosure.

FIG. 3 is a top plan view of the gasket according to the exemplary embodiment of the present disclosure.

Referring to FIG. 3, the bolt holes 145, which penetrate the gasket 100 in a thickness direction, are formed at predetermined positions of the gasket 100. Four bolt holes 145 are formed, but the positions and the number of bolt holes may be varied according to design specifications.

In the exemplary embodiment of the present disclosure, a thickness of the gasket 100 at a portion where the bolt holes 145 are formed differs from a thickness of the gasket 100 at a portion where no bolts holes 145 are formed, thereby improving sealing performance.

Figure 4:
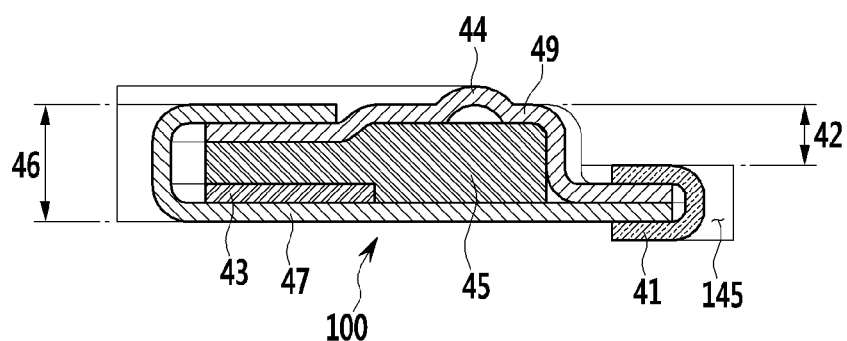
FIG. 4 is a cross-sectional view of the gasket according to the exemplary embodiment of the present disclosure, taken along line A-A.

FIG. 4 is a cross-sectional view of the gasket according to the exemplary embodiment of the present disclosure, taken along line A-A.

Referring to FIG. 4, the gasket 100 includes a bolt seam 41, a first seam 47, a second seam 49, a reinforcing seam 43, a sealing bead 44, and mica 45.

The first seam 47 is disposed at one surface, the second seam 49 is disposed at the other surface at an interval from the first seam 47, portions of the first and second seams 47 and 49, which are positioned at the bolt hole 145 side, are closely attached to each other, and the bolt seam 41 is bent to fix the first and second seams 47 and 49 together.

An inner end of the first seam 47 is bent and closely attached to an outer surface of the second seam 49, the mica 45 is interposed between the first and second seams 47 and 49, and the reinforcing seam 43 is disposed on an inner surface of the first seam 47 which is opposite to the bolt seam 41.

The sealing bead 44, which protrudes by being bent, is integrally formed with an outer surface of the second seam 49, and a level difference 42 is formed in the thickness direction between the bolt seam 41 and the second seam 49. Furthermore, a portion of the gasket 100, which is opposite to the bolt seam 41, has a first thickness 46.

Figure 5:
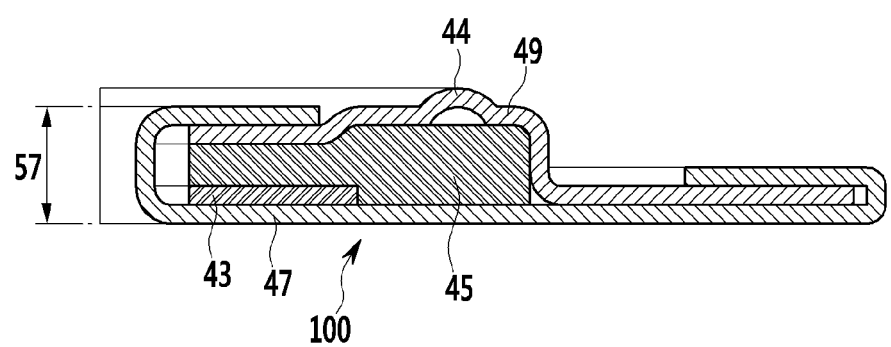
FIG. 5 is a cross-sectional view of the gasket according to the exemplary embodiment of the present disclosure, taken along line B-B.

FIG. 5 is a cross-sectional view of the gasket according to the exemplary embodiment of the present disclosure, taken along line B-B.

Referring to FIG. 5, the first seam 47 is disposed at one surface, the second seam 49 is disposed at the other surface at an interval from the first seam 47, outer portions of the first and second seams 47 and 49 are closely attached to each other, and an outer end of the first seam 47 is bent and fixed to the second seam 49.

Furthermore, the inner end of the first seam 47 is bent and closely attached to the outer surface of the second seam 49, the mica 45 is interposed between the first and second seams 47 and 49, and the reinforcing seam 43 is disposed on the inner surface of the first seam 47.

The sealing bead 44, which protrudes by being bent, is integrally formed with the outer surface of the second seam 49, and the gasket 100 has a second thickness 57.

Referring to FIGS. 4 and 5, in the gasket 100, the second thickness 57 of the gasket 100, which corresponds to the portion where no bolt hole 145 is formed, is greater than the first thickness 46 of the gasket 100, which corresponds to the bolt hole 145. Therefore, it is possible to improve a sealing structure and prevent a collapse of the gasket, or the like.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An exhaust system having a gasket, the exhaust system comprising:
   a turbocharger disposed to be rotated by exhaust gas;
   a warming up catalytic converter through which exhaust gas discharged from the turbocharger passes and which purifies the exhaust gas;
   a connecting pipe, disposed between the turbocharger and the warming up catalytic converter, which delivers the exhaust gas;
   a gasket, interposed between an inlet side flange of the connecting pipe and an outlet side flange of the turbocharger, which seals the exhaust gas; and
   a stay which connects the warming up catalytic converter to a vehicle body, and includes an elastically flexible curved line portion formed at one side of the stay,
   wherein a stepped protrusion, which protrudes toward the outlet side flange of the turbocharger, is formed at a central portion of the inlet side flange of the connecting pipe through which the exhaust gas flows,
   a stepped groove, which corresponds to the stepped protrusion, is formed in the outlet side flange of the turbocharger, and
   the gasket is interposed at a portion except for the stepped protrusion and the stepped groove.

2. The exhaust system of claim 1, further comprising a housing arm which protrudes from one side of an outer cover housing of the warming up catalytic converter,
   wherein one end of the stay is fixed to the vehicle body and the other end of the stay is connected to the housing arm.

3. The exhaust system of claim 2, wherein the stay includes:
   a vehicle body fixing plate which is fixed to the vehicle body;
   a housing fixing plate which is fixed to the housing arm; and
   a flexible curved line portion which is disposed between the vehicle body fixing plate and the housing fixing plate and has a predetermined curved line shape.

4. The exhaust system of claim 3, wherein the vehicle body fixing plate, the housing fixing plate, and the flexible curved line portion are integrally formed by bending a single plate.

5. The exhaust system of claim 3, wherein one surface of the flexible curved line portion is convex, and the other surface thereof is concave.

6. The exhaust system of claim 2, wherein the housing arm is fixed to the outer cover housing adjacent to an outlet side flange of the warming up catalytic converter.

7. The exhaust system of claim 1, wherein a bolt hole to which a bolt is fastened is formed in the gasket,
   the gasket has a first thickness that corresponds to the bolt hole,
   the gasket has a second thickness that corresponds to a portion where no bolt hole is formed, and
   the second thickness is greater than the first thickness by a predetermined degree.

8. A vehicle having an exhaust system comprising:
   an engine disposed in a vehicle body to generate torque by combusting fuel;
   a turbocharger disposed to be rotated by exhaust gas discharged from the engine;
   a warming up catalytic converter through which exhaust gas discharged from the turbocharger passes and which purifies the exhaust gas;
   a connecting pipe, disposed between the turbocharger and the warming up catalytic converter, which delivers the exhaust gas;
   a gasket, interposed between an inlet side flange of the connecting pipe and an outlet side flange of the turbocharger, which seals the exhaust gas; and
   a stay which connects the warming up catalytic converter to the vehicle body, and has an elastically flexible curved line portion formed at one side of the stay,
   wherein a stepped protrusion, which protrudes toward the outlet side flange of the turbocharger, is formed at a central portion of the inlet side flange of the connecting pipe through which the exhaust gas flows, a stepped groove, which corresponds to the stepped protrusion, is formed in the outlet side flange of the turbocharger, and the gasket is interposed at a portion except for the stepped protrusion and the stepped groove.

9. The vehicle of claim 8, further comprising a housing arm which protrudes from one side of an outer cover housing of the warming up catalytic converter, wherein one end of the stay is fixed to the vehicle body, and the other end of the stay is connected to the housing arm.

10. The vehicle of claim 9, wherein the stay includes:

a vehicle body fixing plate fixed to the vehicle body;

a housing fixing plate fixed to the housing arm; and a flexible curved line portion disposed between the vehicle body fixing plate and the housing fixing plate and has a predetermined curved line shape.

11. The vehicle of claim 10, wherein the vehicle body fixing plate, the housing fixing plate, and the flexible curved line portion are integrally formed by bending a single plate.

12. The vehicle of claim 10, wherein one surface of the flexible curved line portion is convex, and the other surface thereof is concave.

13. An exhaust system having a gasket, the exhaust system comprising:

a turbocharger disposed to be rotated by exhaust gas;

a warming up catalytic converter through which exhaust gas discharged from the turbocharger passes and which purifies the exhaust gas;

a connecting pipe, disposed between the turbocharger and the warming up catalytic converter, which delivers the exhaust gas;

a gasket, interposed between an inlet side flange of the connecting pipe and an outlet side flange of the turbocharger, which seals the exhaust gas; and a stay which connects the warming up catalytic converter to a vehicle body, and includes an elastically flexible curved line portion formed at one side of the stay, wherein a stepped protrusion, which protrudes toward the inlet side flange of the connecting pipe, is formed at a central portion of the outlet side flange of the turbocharger through which the exhaust gas flows, a stepped groove, which corresponds to the stepped protrusion, is formed in the inlet side flange of the connecting pipe, and the gasket is interposed at a portion except for the stepped protrusion and the stepped groove.

\* \* \* \* \*